Oct. 16, 1934.  A. A. KRAMER  1,977,389

GRAIN BIN

Filed Oct. 27, 1930  3 Sheets-Sheet 1

INVENTOR
Andrew A. Kramer
BY
Alfred R. Fuchs
ATTORNEY

Oct. 16, 1934.                    A. A. KRAMER                    1,977,389
                                  GRAIN BIN
                             Filed Oct. 27, 1930           3 Sheets-Sheet 2
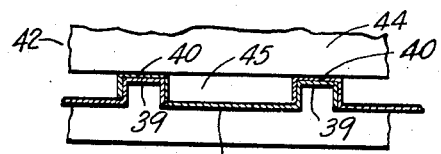
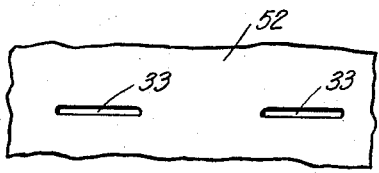
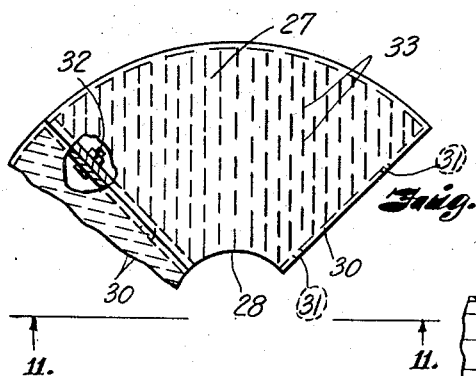
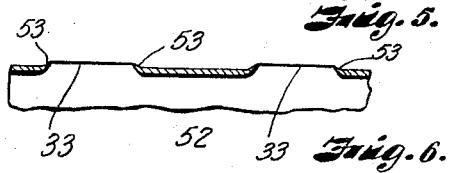
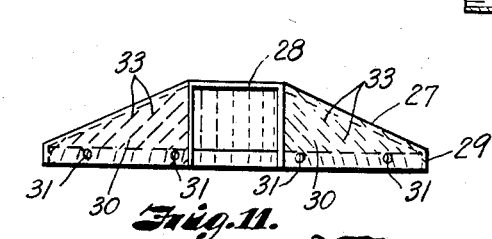
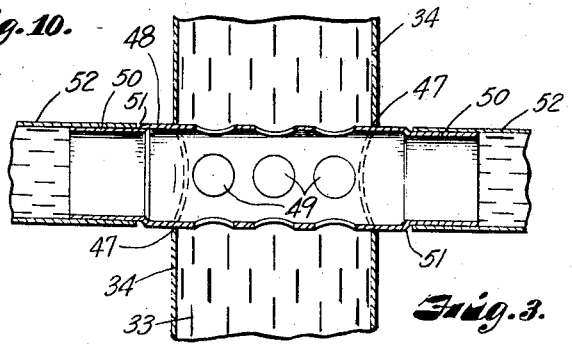
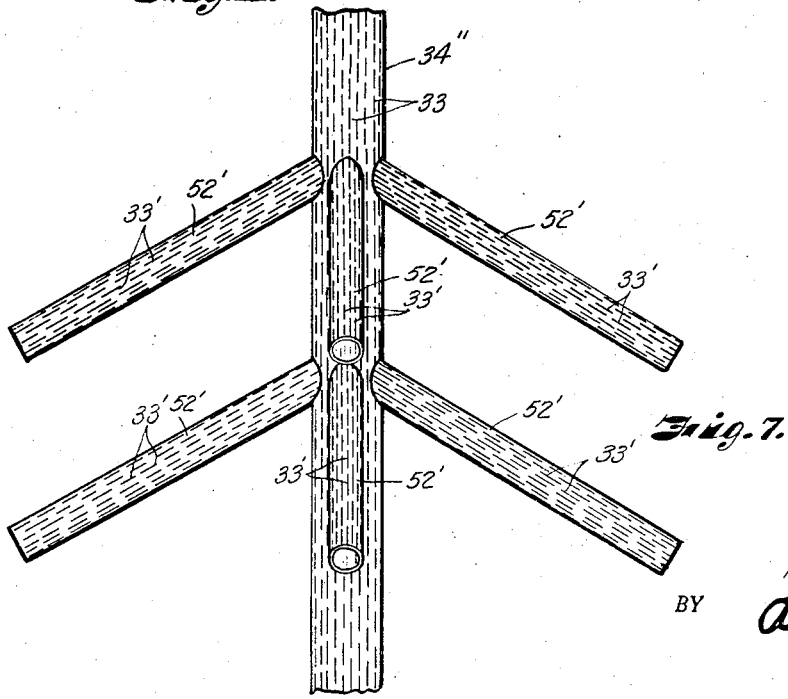
INVENTOR.
Andrew A. Kramer
BY Alfred R. Fuchs
ATTORNEY.

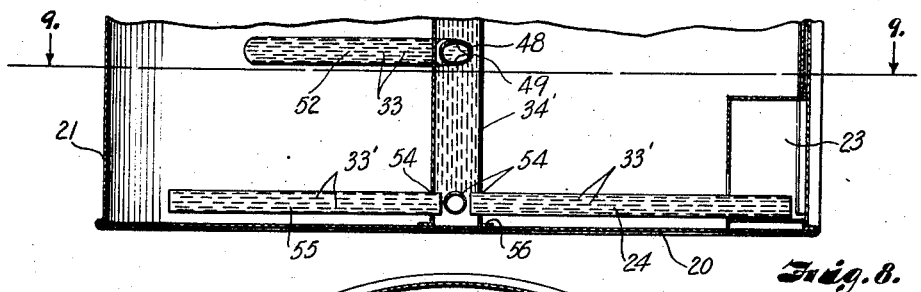
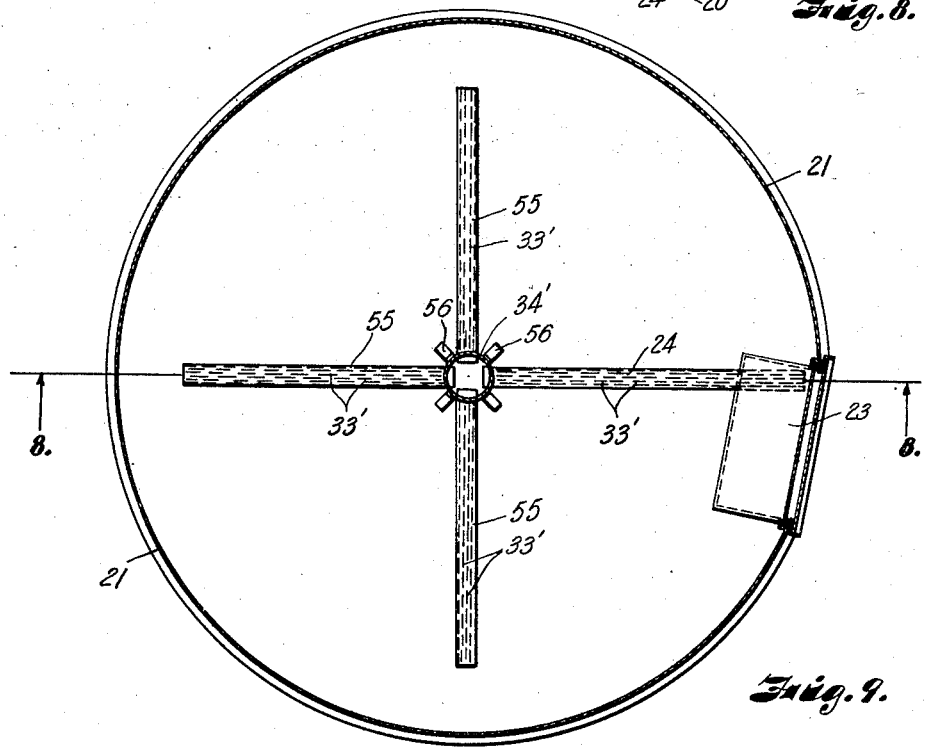

Patented Oct. 16, 1934

1,977,389

UNITED STATES PATENT OFFICE 1,977,389

GRAIN BIN

Andrew A. Kramer, Kansas City, Mo.

Application October 27, 1930, Serial No. 491,457

15 Claims. (Cl. 98—55)

My invention relates to grain bins, and more particularly to a ventilating means for a grain bin.

It is a purpose of my invention to provide a ventilating means for a grain bin that is particularly adaptable for metal grain bins of a generally cylindrical form with a conical roof and in which air is drawn in near the bottom of said bin and discharged at the roof.

It is a further purpose of my invention to provide a ventilating means for a grain bin that will withdraw air from the body of grain over substantially the entire area thereof and feed the air into the grain at such a point that the air will pass through the entire body of grain ventilating the same, preventing undue heating thereof, and aiding in the withdrawal of moisture from the body of grain in the bin.

My invention more particularly relates to a ventilating means for a grain bin comprising a central stack, to which air is fed from outside the body of grain into said stack near the bottom thereof to create an upward current of air therein, and with which discharging means for the incoming air is associated to distribute the air through the body of grain near the bottom thereof, and which is provided with air collecting means distributed throughout the body of the grain, said collecting means comprising perforated tubular members radiating and branching out from the stack at a plurality of points.

It is a further purpose of my invention to provide a grain bin in which the ventilating means is readily assembled and disassembled, the same being held in assembled relation without the use of any fastening devices, and which is so constructed that the air collecting tubes are free except at the point where the same join with the stack, thus allowing a certain amount of movement or flexibility for the collecting tubes and the stack, whereby said tubes may assume their position in the body of grain without any undue strain on the connections or on the stack, it being found that the collecting tubes will tend to rise with the grain as the same is being filled into the bin, and will tend to lower with the grain as the same is being withdrawn from the bin.

Other objects and advantages of my invention will appear as the description of the drawings proceeds. I desire to have it understood, however, that I do not intend to limit myself to the particular details of construction shown or described, but that I intend to include as part of my invention all such obvious changes and modifications as would occur to a person skilled in this art and as would fall within the scope of the claims.

In the drawings:

Fig. 3 is an enlarged fragmentary vertical sectional view through a portion of the stack and portions of the collecting tubes.

Fig. 4 is a fragmentary sectional view through a portion of the roof adjacent the center thereof.

Fig. 5 is a fragmentary elevational view on an enlarged scale of one of the ventilating tubes.

Fig. 6 is a fragmentary sectional view on an enlarged scale of one of the ventilating tubes.

Fig. 7 is a fragmentary elevational view of a modified form of ventilating means.

Fig. 8 is a fragmentary vertical sectional view of the bottom portion of the bin showing a further modified form of ventilating means, the section being taken on the line 8—8 of Fig. 9.

Fig. 9 is a horizontal sectional view of the device shown in Fig. 8, the section being taken substantially on the line 9—9 of Fig. 8.

Fig. 10 is a fragmentary top plan view of the conical air distributing member shown in Fig. 1, partly broken away, and Fig. 11 is a side elevation of one of the sections of the cone shown in Fig. 10 as viewed from the line 11—11 in Fig. 10.

Figure 1:
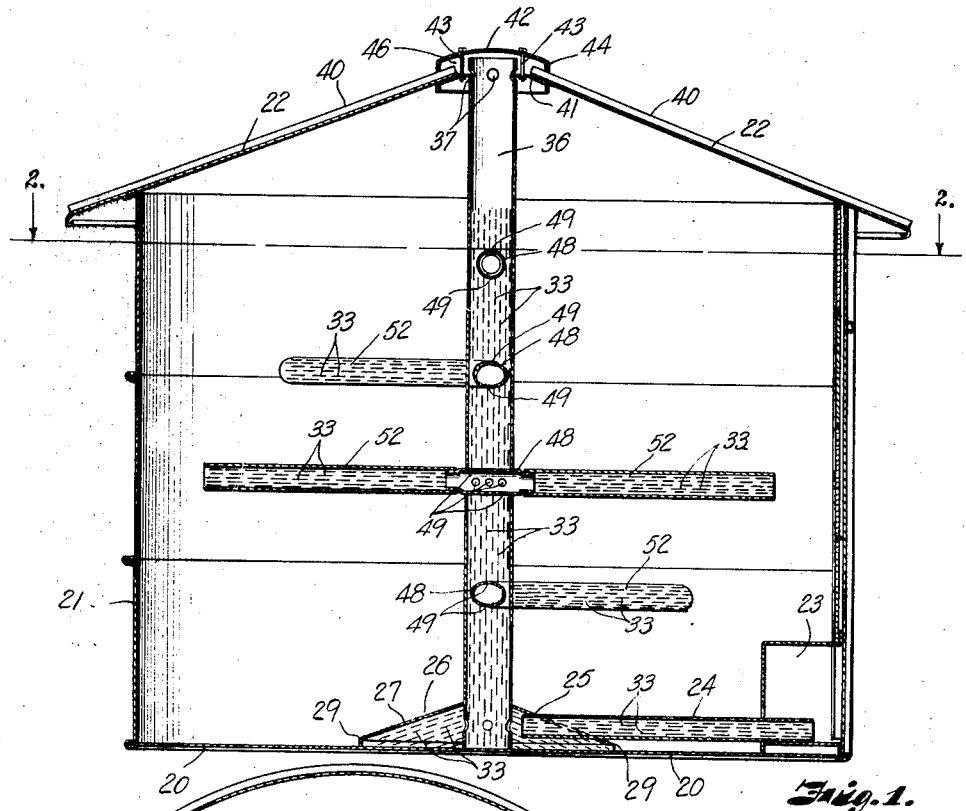
Fig. 1 is a vertical sectional view through a grain bin showing my improved ventilator being applied thereto, the section being taken substantially on the line 1—1 of Fig. 2.

Referring in detail to the drawings, in Figs. 1, 2, 8 and 9 is shown a grain bin having a bottom 20, a vertical side wall portion 21 and an inclined or conical roof 22, said grain bin being of a well known construction as far as described, and being made of sheet metal. Said grain bin is provided with a sheet metal scoop chamber or box 23, which may be provided with any suitable closure, and through which the grain is withdrawn from the bin.

Extending into the chamber 23 in all forms of the invention shown is an air inlet tube 24, said tube serving to supply fresh air to the ventilating means. The tube 24 is provided with suitable perforations, the preferred form of which will be described below.

Figure 2:
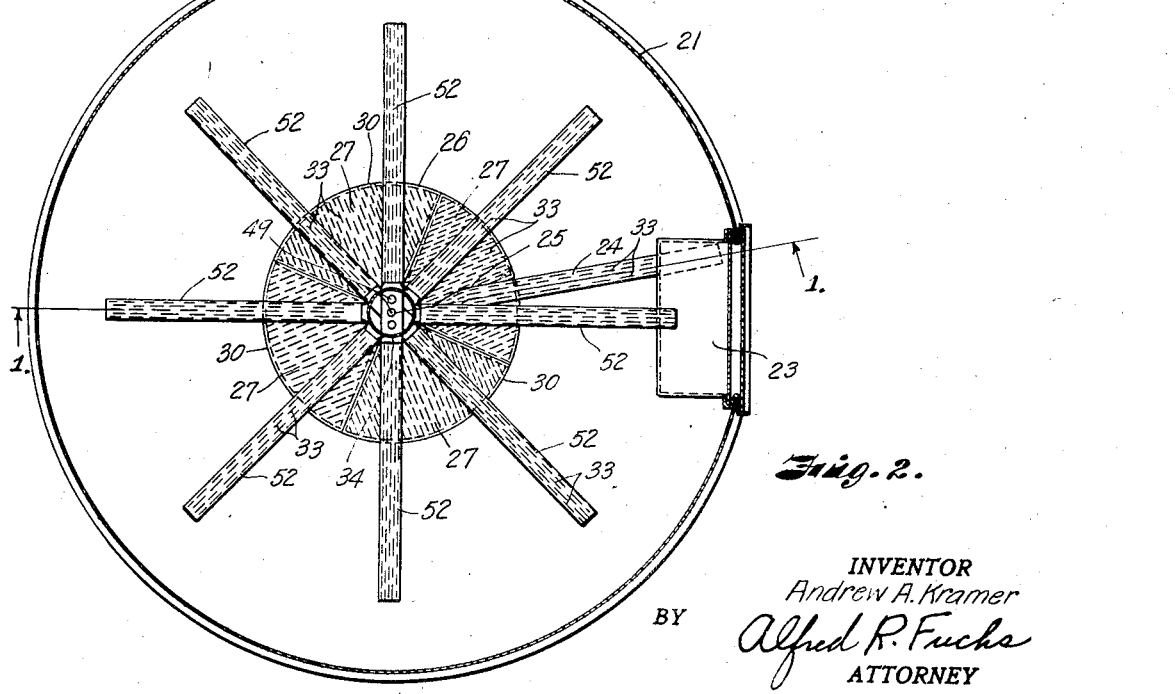
Fig. 2 is a horizontal sectional view through the grain bin taken substantially on the line 2—2 of Fig. 1.

In the form of the invention shown in Figs. 1 and 2, the fresh air supply tube 24 leads into a suitable opening 25, provided in a conical air distributing member 26. The tubular member 24 is merely stuck through an opening into the scoop chamber 23 and through the opening 25 in the conical member 26, there being no fastening means provided for either end thereof.

The member 26 is made in sections, as will be evident from Fig. 2. While any number of sections may be provided, it has been found desirable to make the same of four sections, each of which comprises a conical or inclined top wall portion 27, which is cut out on the arc of a circle 28 so that the four sections thereof form a circular opening in the top of the cone 26. The outer edge of each section is flanged downwardly at 29 to form a cylindrical rim portion, and each section is further provided with the radially extending flanges 30. The flanges 30 are provided with aligning openings 31, through which the bolts 32 for securing the sections together are passed. The sections of the cone when so secured together form a self supporting member which is adapted to rest on the bottom 20 of the bin on the lower edges of the flanges 29 and 30.

The sections 27 are perforated, the perforations being indicated by the numeral 33 and being of the same form as those in the tubular member 24. The entire sheet from which the sections of the cone are made is perforated, thus providing perforations in both the inclined or conical outer wall 27 of the cone and the flanges 30. The sections are all alike except that one of the same has the wall 27 thereof provided with the opening 25.

A stack or central ventilating tube 34 extends through the opening in the center of the cone 26, and has the lower end thereof in engagement with the bottom 20. The stack 34 is provided with perforations 33 similar to those provided in the cone 26 and the tubular member 24, the perforations 33 extending from the bottom of the stack 34 to a height approximating substantially the height of the side wall portion 21 of the bin, the upper portion 36 of the stack being imperforate except for a series of openings 37 adjacent the extreme upper end thereof.

The roof 22 is made up of sections, as is well known, the inner end portions or the portions of the roof sections adjacent the center of the roof being shown more in detail in Fig. 4, each roof section being provided with a substantially flat portion 38 and with a box flange or rib 39 nested with an overlapping box flange or rib 40 on the next adjoining section. The center of the roof is held in assembled position by means of a pair of cap members 41 and 42, which are secured together by means of the bolts 43. The cap members 41 and 42 are made of similar shape, but the cap member 41 has a central opening for receiving the stack 34, the cap member 42 having a depending flange 44, which, as shown in Fig. 4, rests on the upper surface of the box flange 40 of the roof sections, leaving openings or slots 45 between the portions 38 of the roof sections and the cap 44.

The stack 34 extends into the space 46 that exists between the cap 41 and the cap 42, and the upper end thereof is preferably spaced from the cap 42 so that the air will discharge from the upper end thereof into the space 46, and through the slots 45. The openings 37 are provided so that in case the roof should settle down at the center on to the top of the stack 34, the air will discharge through the openings 37 into the space 46 and out through the slots 45, thus assuring the exit of the air through the upper end of the stack.

The stack 34 is provided with a plurality of openings 47, which are arranged opposite each other and through which the tubular members 48 extend, said tubular members being provided with a plurality of openings 49 to establish communication between the inside of the stack 34 and the inside of the tubular members 48. The outer ends 50 of the tubular members 48 are slightly reduced in diameter to provide the shoulders 51, and receive the inner ends of the air collecting tubes 52, which are telescoped on the portions 50 of the tubular members 48. The air collecting tubes 52 thus extend in pairs on opposite sides of the stack 34 in a substantially radial direction at each of said pairs of openings 47. The openings run spirally around the stack, as will be evident from Fig. 1, so that the perforated tubes 52 will radiate from the stack 34, as shown in Fig. 2, when viewed from a horizontal plane either above or below the same, the tubes of each set being diametrically opposite each other and each set being arranged at an angle to the adjoining set.

While the arrangement of collecting tubes 52 is shown as comprising four sets of tubes each arranged at an angle of 90 degrees to the adjoining set, it will be obvious that any desired number of sets spaced along the stack 34 may be provided, and that the adjoining ones thereof may be arranged at any angle desired relative to each other to obtain the desired distribution of air in the device. The perforations in the members 52 are similar to those previously referred to and are similarly arranged, the same being indicated by the numeral 33 in Figs. 5 and 6, and being formed by a punching operation by means of a sharp edged tool that provides merely a slot or narrow slit in the metal, the metal being flanged outwardly slightly around the edges thereof, as indicated at 53.

Instead of providing the cone 26 in the lower end of the stack 34 for distributing the air coming in through the air intake tube 24, the arrangement shown in Figs. 8 and 9 may be provided, in which the stack 34' is provided with openings 54 that are of sufficient size to receive the tubular member 24 or a tubular member of the same size and similarly perforated, such as the tubular members 55, which lie near the bottom of the grain bin and serve to distribute the air coming in through the tube 24 and entering the bottom of the stack 34' through one of the openings 54, through the body of grain near the bottom thereof. Four openings 54 are shown with three tubes 55, and one tube 24 mounted in the same, but obviously any desired number thereof may be provided as may be found desirable, as long as the openings 54 are not so large in number and so closely spaced as to weaken the walls of the member 34'.

In order to support the stack 34' in an upright position, the angular ears 56 may be provided thereon, serving as feet for supporting the stack 34' at its lower end. The construction is otherwise substantially the same as previously described.

In Fig. 7 a further modification is shown, in which the stack 34'' instead of having merely a pair of oppositely arranged openings therein at each point where the air collecting tubes are connected therewith, may be provided with a plurality of openings arranged in a circular series around the stack 34'', and shaped so as to receive the perforated tubular air collecting members 52' at an oblique angle or with the lower ends thereof inclined downwardly. The tubular members 52' are constructed substantially the same as the members 52, being similarly perforated, but extend at an inclination to the horizontal direction rather than horizontally, as is the case with members 52. In this form of the invention the tubular members 48 that extend through the stack in the previously described forms are omitted.

In all of the forms of the invention the tubular members 52 and 52' are mounted relative to the stack in such a manner that the same can be deflected upwardly or downwardly from their normal position as the grain is either filled into the bin or emptied from it, thus avoiding any undue strain on the parts due to the shifting of said tubular members as the bin is either filled or emptied. This is possible because the outer ends thereof or the ends near the side wall of the bin are free of any support and do not engage with any part of the bin. Furthermore, the ventilating means can be readily shipped knocked down and can be erected quickly without the use of tools, and also quickly taken down, when this is desired.

Having thus described my invention, what I claim is:—

1. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin.

2. The combination with a grain bin having a scoop chamber, of means for ventilating said bin comprising a stack extending from adjacent the bottom of said bin to the roof thereof, an inlet for air adjacent the bottom of said bin leading into said stack from said scoop chamber, perforated air distributing means adjacent said bottom connected with said stack and perforated air collecting tubes radiating from said stack in spaced relation to the bottom of said bin.

3. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin, said stack being perforated from adjacent the bottom thereof to a point spaced a substantial distance from said roof and being imperforate from said point to the roof.

4. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin, said air collecting tubes being free except where connected with said stack.

5. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin, said air collecting tubes being mounted on said stack so as to be movable relative thereto.

6. The combination with a grain bin having a roof having outwardly directed ribs or flanges thereon, a pair of spaced cap members engaging the central portion of said roof on opposite faces thereof to provide a chamber therebetween open to the outer air, of means for ventilating said bin comprising a stack extending from adjacent the bottom of said bin into said chamber, an inlet for air adjacent the bottom of said bin leading into said stack, perforated air distributing means adjacent said bottom connected with said stack and perforated air collecting tubes radiating from said stack in spaced relation to the bottom of said bin.

7. The combination with a grain bin, of means for ventilating said bin comprising a stack extending from adjacent the bottom of said bin to the roof thereof, and a series of vertically spaced inclined perforated air collecting tubes extending through openings in and being open into said stack and radiating therefrom, said tubes being inclined upwardly toward said stack.

8. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin, said stack being provided with a plurality of air discharge openings near the upper end thereof.

9. The combination with a grain bin, of means for ventilating said bin comprising a stack extending from adjacent the bottom of said bin to the roof thereof, said stack having opposed openings therein at spaced points along the length thereof, tubular members mounted in said openings and extending entirely through and outwardly beyond said stack, said tubular members having openings in the portion thereof within said stack therein to establish communication between said tubular members and said stack and perforated air collecting tubes telescopically mounted on said tubular members, the outer ends thereof being free.

10. The combination with a grain bin, of means for ventilating said bin comprising a stack extending from adjacent the bottom of said bin to the roof thereof, an inlet for air adjacent the bottom of said bin leading into said stack and air distributing means adjacent said bottom connected with said stack, said distributing means comprising a plurality of segmental perforated conical members having means for securing the same together to form a cone surrounding the bottom of said stack.

11. The combination with a grain bin, of means for ventilating said bin comprising a stack extending from adjacent the bottom of said bin to the roof thereof, an inlet for air adjacent the bottom of said bin leading into said stack and air distributing means adjacent said bottom connected with said stack, said distributing means comprising a plurality of segmental perforated conical members having means for securing the same together to form a cone surrounding the bottom of said stack, said segmental members having radial flanges for supporting the same on the bottom.

12. The combination with a grain bin, of means for ventilating said bin comprising a stack extending from adjacent the bottom of said bin to the roof thereof, an inlet for air adjacent the bottom of said bin leading into said stack and air distributing means adjacent said bottom connected with said stack, said distributing means comprising a plurality of segmental perforated conical members having means for securing the same together to form a cone surrounding the bottom of said stack, said segmental members having radial flanges for supporting the same on the bottom and being open on the inner sides thereof.

13. The combination with a grain bin, of means for ventilating said bin comprising a stack extending from adjacent the bottom of said bin to the roof thereof, an inlet for air adjacent the bottom of said bin leading into said stack and air distributing means adjacent said bottom connected with said stack, said distributing means comprising a plurality of segmental perforated conical members having means for securing the same together to form a cone surrounding the bottom of said stack, said stack having a plurality of relatively large openings therein within said cone.

14. The combination with a grain bin, of means for ventilating said bin comprising a stack extending from adjacent the bottom of said bin to the roof thereof, an inlet for air adjacent the bottom of said bin leading into said stack, perforated air distributing means adjacent said bottom connected with said stack and perforated air collecting tubes radiating from said stack in spaced relation to the bottom of said bin, said distributing means comprising tubes radiating from said stack adjacent the bottom of said bin.

15. The combination with a grain bin having a roof provided with ribs thereon, and spaced cap members at the center of said roof providing an air space therebetween having outlets between said ribs, of means for ventilating said bin comprising a stack extending in a substantially vertical direction discharging into said space, and having perforations therein, and perforated tubular members radiating from said stack and spaced vertically along said stack, said tubular members being in open communication with said stack.

ANDREW A. KRAMER.